(12) United States Patent
Fabrick, II

(10) Patent No.: US 7,757,186 B2
(45) Date of Patent: Jul. 13, 2010

(54) AUTOMATIC MAPPING OF POINTING DEVICES TO MULTIPLE DISPLAYS

(75) Inventor: Richard W. Fabrick, II, Dublin, CA (US)

(73) Assignee: Apple Inc., Cupertino, CA (US)

( * ) Notice: Subject to any disclaimer, the term of this patent is extended or adjusted under 35 U.S.C. 154(b) by 1306 days.

(21) Appl. No.: 10/614,606

(22) Filed: Jul. 7, 2003

(65) Prior Publication Data

US 2005/0007351 A1    Jan. 13, 2005

(51) Int. Cl.
*G06F 3/00* (2006.01)
(52) U.S. Cl. .............. 715/862; 715/826; 715/827; 715/864; 715/835; 715/810; 715/825
(58) Field of Classification Search .......... 715/856, 715/862
See application file for complete search history.

(56) References Cited

U.S. PATENT DOCUMENTS

| | | | | |
|---|---|---|---|---|
| 5,745,100 A * | 4/1998 | Bates et al. | .............. | 345/157 |
| 5,990,893 A * | 11/1999 | Numazaki | .............. | 715/863 |
| 6,088,023 A * | 7/2000 | Louis et al. | .............. | 345/173 |
| 6,219,027 B1 * | 4/2001 | Shimizu et al. | .............. | 715/733 |
| 6,271,835 B1 * | 8/2001 | Hoeksma | .............. | 345/168 |
| 6,337,703 B1 * | 1/2002 | Konar et al. | .............. | 715/858 |
| 6,842,795 B2 * | 1/2005 | Keller | .............. | 710/15 |
| 7,124,374 B1 * | 10/2006 | Haken | .............. | 715/859 |
| 7,430,721 B2 * | 9/2008 | Johanson et al. | .............. | 715/761 |
| 2008/0301675 A1 * | 12/2008 | Cromer et al. | .............. | 718/1 |

OTHER PUBLICATIONS

Stone et al, PointRight: Experience with Flexible Input Redirection in Interactive Workspaces, pp. 1-8, 2002.*
Streitz et al . i-LAND: An interactive Landscape for Creativity and Innovation, pp. 120-127, 1999.*
Wacom Europe forum, Dual monitor discussion, p. 1, Apr. 20, 2002.*
Brad Johanson, Greg Hutchins, Terry Winograd, Maureen Stone; "PointRight: Experience with Flexible Input Redirection in Interactive Workspaces", ACM Press, New York, NY, 2002.

* cited by examiner

*Primary Examiner*—Ryan F Pitaro
(74) *Attorney, Agent, or Firm*—Henneman & Associates, PLC; Larry E. Henneman, Jr.

(57) ABSTRACT

An automatic pointing device mapping method (400, 420) and associated apparatus for automatically remapping the active area (12) of a graphics tablet (10) to a plurality of displays (122, 124), such as might be used in conjunction with a graphics program (130), a CAD program, or the like. Proximity zones (230, 232) are established along the edge of the active area (12). When a stylus (146) is moved into one of the proximity zones (230, 232), the graphics tablet (10) is switched to control the display (122, 124) in the corresponding direction, provided such a display (122, 124) exists in that direction. In one embodiment data regarding an elapsed time data (220), which is the time the stylus (146) has remained in the proximity zone (230, 232) is monitored, such that the multi-display system (110) is not remapped until the stylus (146) has remained in the proximity zone (230, 232) until a preset time (218) has elapsed.

44 Claims, 6 Drawing Sheets

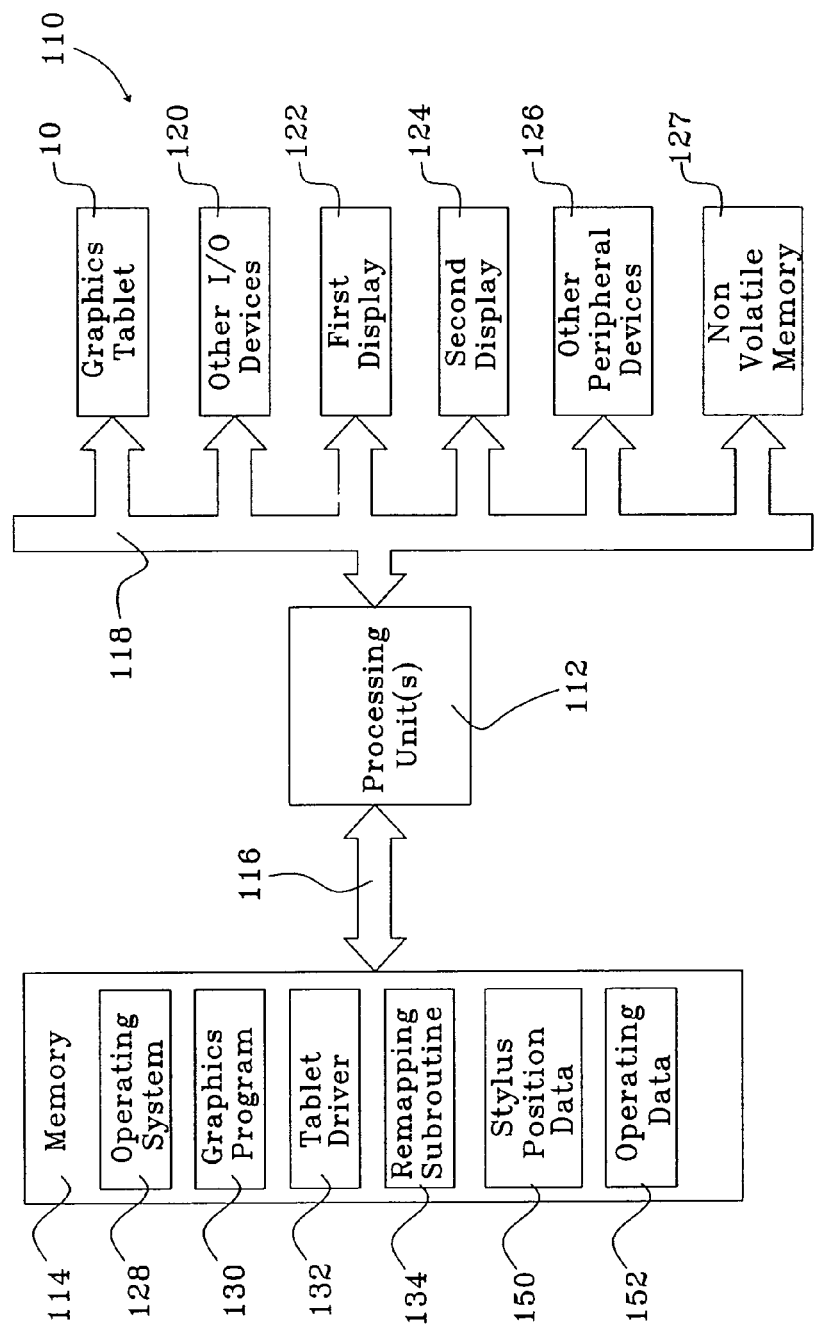

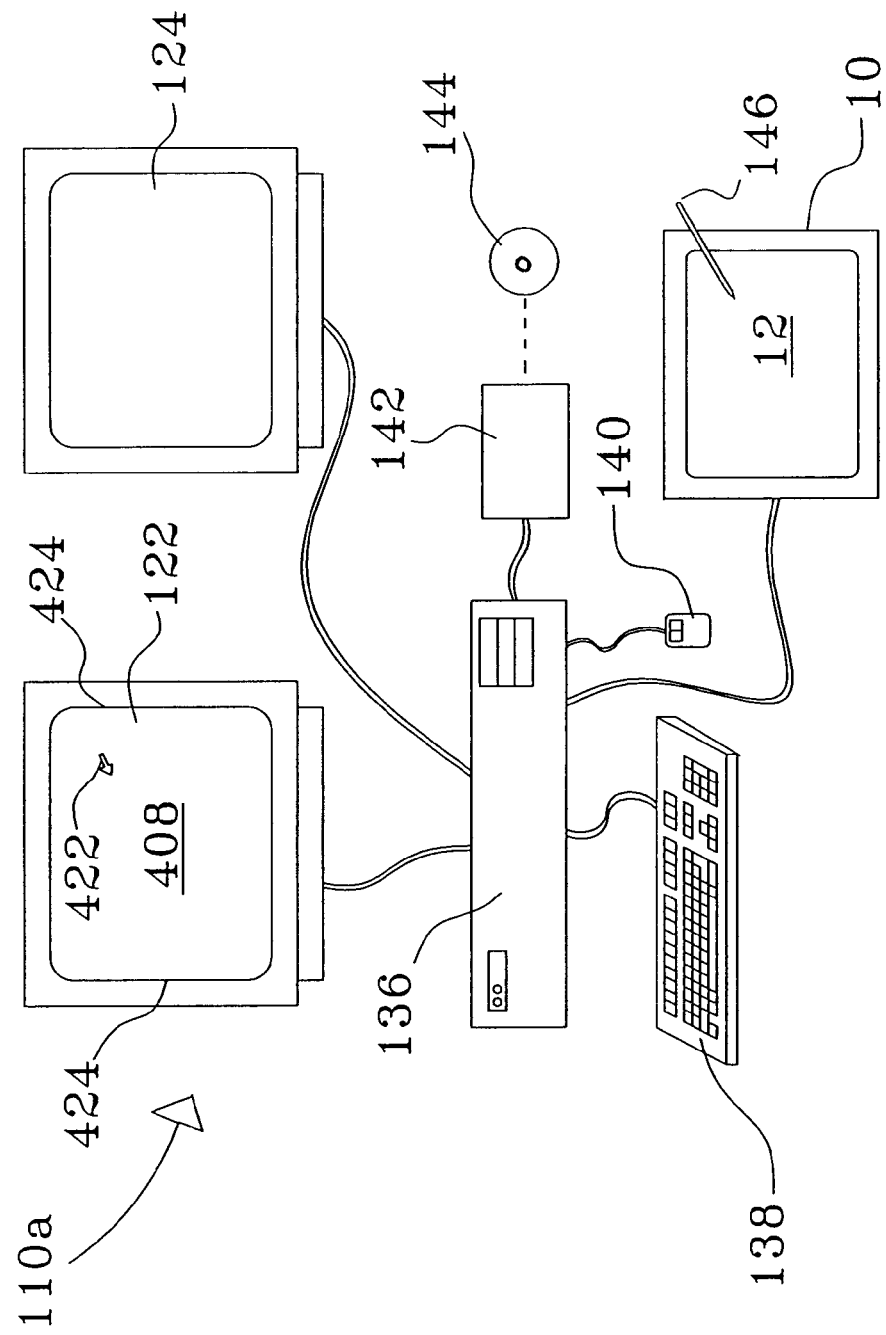

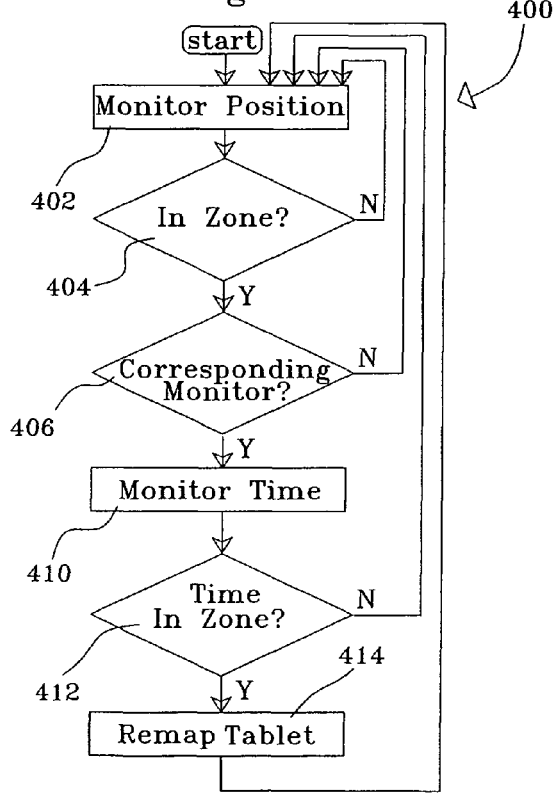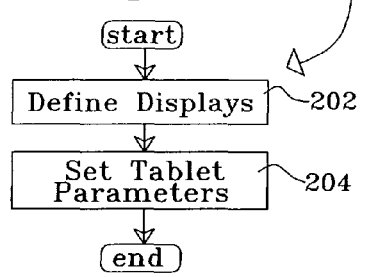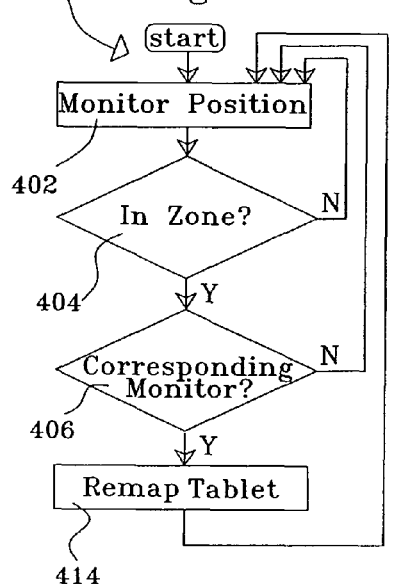

1200

1202 — Monitor ID
1204 — Perimeter Coordinates

| Monitor ID | Perimeter Coordinates |
|---|---|
| 1002 | (4, 0-6), (4-12, 6), (12, 0-6), (4-12, 0) |
| 1004 | (0, 0-3), (0-4, 3), (4, 0-3), (0-4, 0) |
| 1006 | (5, 6-9), (5-11, 9), (11, 6-9), (5-11, 6) |
| 1008 | (12, 3-6), (12-16, 6), (16, 3-6), (12-16, 3) |
| 1010 | (12, 0-3), (12-16, 3), (16, 0-3), (12-16, 0) |
| 1012 | (16, 3-6), (16-20, 6), (20, 3-6), (16-20, 3) |

| Boundary ID | Boundary Location | (−) Monitor ID | (+) Monitor ID |
|---|---|---|---|
| 1020 | (4, 0-3) | 1004 | 1002 |
| 1022 | (5-11, 6) | 1002 | 1006 |
| 1024 | (12, 3-6) | 1002 | 1008 |
| 1026 | (12, 0-3) | 1002 | 1010 |
| 1028 | (12-16, 3) | 1010 | 1008 |
| 1030 | (16, 3-6) | 1008 | 1012 |

Fig. 13

AUTOMATIC MAPPING OF POINTING DEVICES TO MULTIPLE DISPLAYS

BACKGROUND OF THE INVENTION

1. Field of the Invention

This invention relates generally to the field of computer pointing devices and more particularly to a system and method for controlling the operation of certain pointing devices, such as graphics tablets. A predominant current usage of the present inventive automatic mapping method and apparatus is in the automatic mapping of a single pointing device to a plurality of display devices.

2. Description of the Background Art

Pointing devices used in computing are often classified generally as either relative or absolute pointing devices. Mice, track balls, and the like, are usually best used as relative devices, such that a cursor on a display screen will begin to move from its present location according to controlling movement of the pointing device. On the other hand, a graphics tablet is usually used in an absolute mode, such that the cursor is positioned according to where a pen is placed on the tablet. For example, if the cursor is positioned at the lower right corner of the display screen and the user wishes it to be at the upper left corner, the user need only place the pen at the upper left corner of the tablet, and the cursor will "jump" to that position. That is, the user need not "drag" the cursor from the first position to the second.

It is well known in the art to use multiple display screens in many computing applications. The multiple displays might all be driven from the same computer device or, alternatively, they might each be driven by different computers all of which are under the control of the same user and user interface devices. Just one of many possible examples of such usage is found in computer aided design ("CAD"), graphics and/or video applications, wherein a user might have displayed on one screen the end product (a picture, drawings, moving video display, or the like) that is being acted upon. On another screen might be a menu of choices available for acting upon the end product, a command list, or the like. Such applications are, by no means, limited to the use of only two displays. One example might be where the user has a command screen, a "before" screen and an "after" screen, where the before and after screens show, respectively, an image both before and after a command has been executed upon it. Still another example might be a video application wherein one screen is used to show a first movie clip, a second screen to show a second movie clip, and a third screen to show a merged movie clip wherein a portion of the first movie clip is cut or faded into a portion of the second movie clip. As stated above, these are only a few of the many examples of applications wherein a plurality of display screens are, or could be, used to advantage by a single user.

Where multiple display screens are used, the user will wish to be able to control or access the data, image, or the like, that is displayed on each of the screens. Since the user has a limited number of hands, it is likely that the user would want to access all of the displays using a single absolute pointing device. Indeed, it is known and customary to use a single absolute pointing device in multiple display configurations. However, all known prior art methods of doing so have entailed some considerable limitations. For example, when an absolute pointing device ("APD") is connected to a computing device, it is normally mapped to either the entire visible area (made up of all connected displays) or to a portion of the visible area (usually one of the connected displays). The APD is constantly mapped to the same area until explicitly changed by the user through a user definable setting.

It would be advantageous to have the entire sensitive area of a graphics tablet correspond to the entire area of a corresponding display screen. The larger the image of the display screen is on the sensitive area of the graphics tablet, the better will be the corresponding control resolution of the graphics tablet. Using a large area of the tablet gives the operator better control.

One prior art method of mapping two displays to a graphics tablet is illustrated in the diagrammatic view of FIG. 1. In the view of FIG. 1 it can be seen that a graphics tablet 10 has an active area 12. In the example of FIG. 1, the active area 12 is mapped to a first display screen area 14 and a second display screen area 16. The two display screen areas 14 and 16 correspond to two display screens (not shown in this view). This arrangement has the advantage that the operator has ready access to control either of the displays. However, it has the disadvantage that both of the display areas 14 and 16 are much smaller than optimal, thereby reducing the resolution and corresponding user control and accuracy. Indeed, much of the active area 12 is not used at all, and much of the available resolution of the graphics tablet 10 is wasted. Of course, the disadvantages of using this sort of method become even greater if it is required to map more than just two displays to the graphics tablet 10.

The second prior art method for mapping a graphics tablet 10 to a multi-display system is illustrated in the view of FIG. 2. In the view of FIG. 2 it can be seen that the entire active area 12 of the graphics tablet 10 is mapped to a single display (first display screen area 14 in this example). One advantage to such a mapping is that the entire active area 12 of the graphics tablet 10 is being utilized, and operator control of the active display screen is maximized. However, a drawback to this mapping is that the user cannot do any work on the second (or other additional) display without taking some specific action to switch the mapping of the graphics tablet 10. Any such action would generally need to be done with another input device such as a keyboard, a standard mouse, a trackball, or the like. Mapping the entire active area 12 to a single display can reduce the user's workflow, as the user must manually switch from one input device to another to work with different displays.

It would be advantageous to have some method or means whereby a user could map at least most of the entire display area of each of a plurality of displays to the active area 12 of the graphics tablet 10, and yet would not have to engage in an extra operation in repeatedly selecting a display. However, to the inventor's knowledge, no such method or apparatus has existed in the prior art.

SUMMARY

The present invention overcomes the problems discussed above in relation to the prior art. According to the present invention, the mapping of the display area of a graphics tablet is selectively automatically changed to correspond to one of a plurality of displays without requiring the user to explicitly make such changes. At any one time, the tablet is fully mapped to a single display, devoting the entire tablet's resolution to the mapped display. The tablet's mapping is automatically changed to a different display based on a simple and intuitive user action. Making the mapping change automatic allows the user to fully navigate a system with multiple displays using a single tablet, while at the same time devoting essentially all of the tablet's resolution to the display to which the tablet is currently mapped. Indeed, even a program can initiate an automatic remapping, for example in response to a magnification change, a view change, or other programmatic event.

An additional advantage is that automatically mapping the tablet allows for a portable computing device which has an integrated tablet (such as a PDA) to be connected to multiple displays without requiring the user to connect additional input devices.

One embodiment of the present invention uses a control zone, usually defined by either the proximity of the cursor to the edge of the display or, using a tablet as an example, the proximity of the stylus to the edge of the tablet, to automatically determine whether to remap the device to an adjacent display. A proximity threshold (distance between the cursor to the edge of the display or the distance between the stylus to the edge of the tablet) can be user definable through a system preference or set to a specific static value. A timeout period can also be used in conjunction with the proximity threshold to make the determination. If a timeout period is used, the cursor (or stylus) must be held within the proximity threshold for the length of time defined by the timeout period before the input device is mapped to a different display. This timeout period can also be user definable or set to a specific, static value.

Once the proximity threshold (and, if used, the timeout period) has been reached, the inventive system checks to see if there is a display adjacent to the display that the cursor is currently on, near the current position of the cursor. If so, the input device is automatically remapped to the adjacent display and the cursor moves to that display. Until the inventive system again changes the displays, the input device is mapped to the new display and the user can manipulate anything on the new display (move a window, double-click on an icon, draw an object, or the like). The user can easily move the cursor from one display to another simply by moving the cursor to the edge of one display and onto another adjacent display.

With automatic remapping of the tablet, the user can take advantage of utilizing the entire area of the tablet, as well as navigating to all connected displays. This provides a great benefit to anyone using a tablet, including graphics professionals as well as persons taking advantage of new and developing technology that uses multiple displays.

The invention can be embodied in an electronically readable media having code embodied therein for causing an electronic device to facilitate any or all of the methods disclosed herein. Examples of electronically readable media include, but are not limited to: removable media devices such as magnetic or optical disks; local or remote hard disks; memory devices including random access, read only, and cache memory; and any other device capable of storing digital data, whether now known or later developed.

These and other objects and advantages of the present invention will become clear to those skilled in the art in view of the description of modes of carrying out the invention, as described herein and as illustrated in the several figures of the drawing. The objects and/or advantages discussed herein are not intended to be an exhaustive listing of all possible objects or advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and/or advantages. Accordingly, any objects and/or advantages which are discussed herein are not essential elements of the present invention, and should not be construed as limitations.

BRIEF DESCRIPTION OF THE DRAWINGS

FIG. 3 is block diagrammatic representation of a computer system such as might be used to implement the present inventive method;

FIG. 4 is a diagrammatic representation of a computer system illustrating one example of the present invention;

FIG. 6 is a flow diagram illustrating one example of a preliminary operation according to the present inventive method;

FIG. 7 is a block diagram of an example of a data structure for an operational data block;

FIG. 8 is a flow diagram illustrating one example of a remapping method according to the present invention;

FIG. 9 is a flow diagram illustrating another example of a remapping method according to the present invention.

FIG. 12 shows an example data structure suitable for use with particular embodiments of the present invention; and FIG. 13 shows another example data structure suitable for use with the present invention.

DETAILED DESCRIPTION

Figure 1:
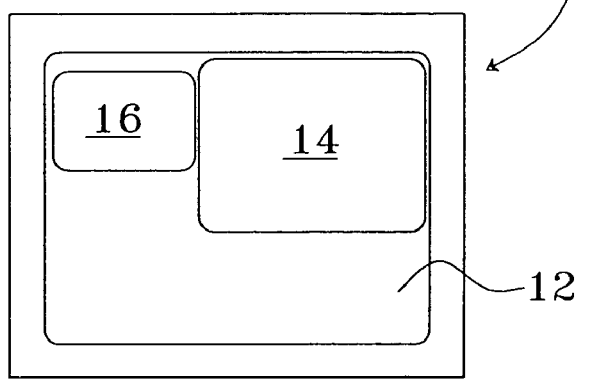
FIG. 1 (prior art) is a diagrammatic illustration of one known method of mapping multiple displays to a graphics tablet.
Figure 2:
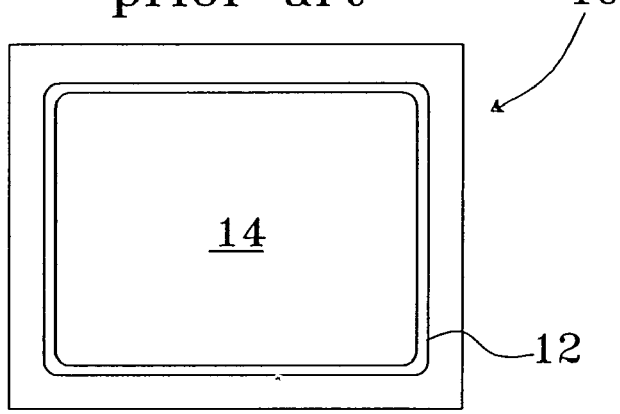
FIG. 2 (prior art) is a diagrammatic illustration of another known method of mapping multiple displays to a graphics tablet.

This invention is described in the following description with reference to the Figures, in which like numbers represent the same or similar elements. While this invention is described in terms of modes for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, or the like, thereby making an article of manufacture in accordance with the invention. The article of manufacture containing the computer programming code is used by either executing the code directly from the storage device, by copying the code from the storage device into another storage device such as a hard disk, RAM, or the like, or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

The present invention overcomes the problems associated with the prior art, by providing a system and method for easily and quickly remapping a graphics tablet in multi-display configurations.

FIG. 3 is a block diagram of a multi-display computer system 110 according to one embodiment of the invention. The multi-display system 110 has a processing unit 112 connected to a working memory 114 (RAM) via a CPU/memory bus 116. A system bus 118 connects the processing unit 112 to additional components, including a graphics tablet 10, as well as other unspecified I/O devices 120 (such as a keyboard, a mouse, and the like). Note that the graphics tablet 10 is used herein as an example of a pointing device such as can be used to accomplish the present inventive method, and particularly an absolute pointing device ("APS").

Also connected to the system bus 118 in this example of the multi-display system 110 are a first display 122 and a second display 124. One skilled in the art will recognize that the complete multi-display system 110 will optionally have other peripheral devices 126 not specifically relevant to the present invention connected thereto, such as network and Internet connection devices, and the like. Nonvolatile memory 127 is provided to store basic code necessary to the multi-display system 110. Nonvolatile memory 127 retains code (e.g., boot code) even when the multi-display system 110 is powered down. Also included in the category of nonvolatile memory is mass data storage such as local hard disk(s), removable media, and the like, for storing data, application programs, the operating system, and the like. This data and code is also retained when the multi-display system 110 is powered down.

One skilled in the art will recognize that the above is a greatly simplified version of an example of the multi-display system 110, sufficient to illustrate the inventive aspects of the present invention. In actual practice, the multi-display system 110 may have several additional busses, and additional components well known to one skilled in the art. Complex systems used for graphics, and the like, may often have additional components not specifically discussed, including but not limited to additional processors. Indeed, it is known to use multiple computers, with one computer acting as a "master" and an additional computer acting as a graphics engine. Therefore, the simple example of FIG. 3 is not intended to represent all practical systems within the scope of the invention. Rather, FIG. 3 illustrates one very simple example, which will suffice to assist in the explanation of the present invention.

Data and programs are temporarily stored in the working memory 114, and retrieved therefrom as needed by the processing unit 112. One skilled in the art will recognized that the locations and availability of the contents of the working memory 114 will be dictated by the hardware configuration of the multi-display system 110 and the software, particularly the operating system, being run thereon. For the purpose of the example of FIG. 3, it should be noted that, during the operation of the present inventive method, the working memory 114 will contain, in whole or in part, an operating system 128, a graphics program 130, a tablet driver 132, and a remapping subroutine 134. One skilled in the art will be familiar with the purpose and operation of the operating system 128. The graphics program 130 is an example of a program which might be used on and in conjunction with the multi-display system 110. The tablet driver 132 is a routine which manages the operation of the graphics tablet 10 and allows it to interface with the multi-display system 110. It is not uncommon to have multiple driver layers, wherein a manufacturer's driver interfaces with a standard interface driver which, in turn, interfaces with the operating system 128. The remapping subroutine 134 contains much of the programming for implementing the present inventive method, as will be discussed in more detail hereinafter.

FIG. 4 is a diagrammatic representation of another example of the multi-display system 110a. As can be seen in the view of FIG. 4, the multi-display system 110a has the first display 122, the second display 124, and the graphics tablet 10 discussed previously in relation to the first discussed multi-display system 110. The processing unit 112, working memory 114 (FIG. 3) and other components not specifically discussed in relation to this view are housed, in this example, within a computer case 136. (It should be noted that the computer case 136 may be, and is in some examples of the invention, integrated with the housing of one of the displays 122, 124). The system 10a has a keyboard 138 and a mouse 140 as examples of the other I/O devices 120 discussed in relation to FIG. 3. An example of the nonvolatile memory 127 of FIG. 3 is a removable media drive 142 (a CD ROM drive, in this example). A removable media disk 144 (a CD in this example) is an example of media such as might be used to contain the inventive remapping subroutine 134 (FIG. 3) and/or additional programs, data, and the like. A stylus 146 is provided, as is customary for use with the graphics tablet 10.

Referring again to the view of FIG. 3, data that will reside in the working memory 114 of the multi-display system 110, 110a will include a stylus position data block 150 and an operational data block 152. The stylus position data block 150 contains generally continually updated data to indicate the position of the stylus 146 over the active area 12 of the graphics tablet 10. Data in the stylus position data block 150 will be created and maintained by the tablet driver 132 according to existing methods well known to those skilled in the art. The operational data block 152 will contain data entered and used according to the present inventive method, and will be discussed in more detail hereinafter. One skilled in the art will recognize that the stylus position data block 150 and the operational data block 152 can exist in the working memory 114 as individual files, as data portions appended to other files, or the like. In the example shown, the stylus position data block 150 and operational data block 152 are each individual files having fields which will be discussed in more detail hereinafter.

Figure 5:
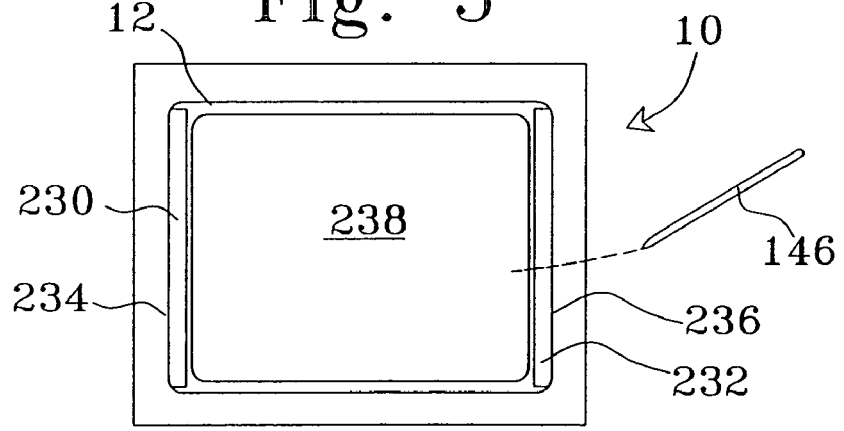
FIG. 5 is a more detailed view of the graphics tablet of FIG. 4.

FIG. 5 is an enlarged view of the graphics tablet 10 of FIG. 4, wherein detail to be discussed hereinafter can be more readily seen. The disclosure of the inventive methods to follow will make reference to both FIGS. 4 and 5. FIG. 6 is a flow diagram of a preliminary method 200, such as might optionally be used to prepare the multi-display system 110, 110a for operation. According to the described embodiment of the invention, some information can be recorded regarding the quantity and location of the displays 122 and 124, an optional time out period (to be discussed in more detail hereinafter) and the like. In a "define displays" operation 202, the user can define the quantity and location of display units to be used. In a "set tablet parameters" operation 204, variables regarding the size of operational zones of the graphics tablet 10 and/or the length of a timeout period can optionally be defined.

FIG. 7 is an example of a data structure of the operational data block 152 (FIG. 3) such as will be created according to the preliminary method 200 (FIG. 6). One skilled in the art will recognize that the arrangement of the data shown in the example of FIG. 7 is somewhat arbitrary. Choices as to the order of the data, whether it is stored as a single multidimensional data table, a plurality of files, or even as addenda to several different files will be up to individual programmers who might implement the invention. However, the Example of FIG. 7 will serve as an example of the data which will be used to accomplish the present inventive method. As can be seen in the view of FIG. 7, the operational data block 152 has a "monitor ID" data field 210, a "monitor on left" data field 212, a "monitor on right" data field 214 and a "monitor active" data field 216. In the "define displays" operation 202 of the preliminary method 200 (FIG. 6) the data fields 210, 212, 214 and 216 will be established.

In the example of the operational data block 152, it is presumed that there are three displays (such as displays 122 and 124 of FIG. 4) available, as indicated by three data columns 217a, 217b and 217c. In the "monitor ID" data field, each of the displays is identified. In this simple example, they are numbered simply 1, 2 and 3. In the "monitor on left" data field 212 and the "monitor on right" data field 214, a stored value indicates whether or not there is a monitor on the left or right of each respective display. In this example where "1" is affirmative and "0" negative, it can be seen in the example of FIG. 7, monitor number 1 would be in the middle, monitor number 2 on the right (having another monitor only on its left) and monitor number 3 on the left. The "monitor active" data field 216 indicates which monitor is currently active (that is, the display of which is currently being controlled by the graphics tablet 10) is recorded. Only one of the monitors can be "active", according to this definition, at any one time.

In the "set tablet parameters" 204 operation of the preliminary method 200 (FIG. 6), the data fields indicated by the "preset time" data field 218 of FIG. 7, the "elapsed time" data field 220 and the "proximity width" data field 222 are established and/or populated. Referring now to both the views of FIGS. 5 and 7, it can be seen that the active area 12 of the graphics tablet 10 has, according to the present invention, a left proximity zone 230 and a right proximity zone 232. As with the example of the first display screen area 14 and second display screen area 16 discussed earlier in relation to the prior art, unless an overlay is used on the graphics tablet 10, the proximity zones 230 and 232 will not be outlined as they are in the view of FIG. 5. Rather, these proximity zones 230 and 232 are shown in the view of FIG. 5 only for the purpose of explaining the present invention.

The proximity zones 230 and 232 indicate areas, the width of which corresponds to the distance from the left edge 234 and right edge 236 of the active area 12 of the graphics tablet 10 within which the stylus 146 can be placed in order to initiate the operation of the inventive method, as will be discussed hereinafter. Data in the "proximity width" data field 222 is a record of the width of the proximity zones 230 and 232. If, as will be discussed hereinafter, an optional time out feature is used, data in the "preset time" data field 218 indicates the amount of time which the stylus 146 must be held in one of the proximity zones in order to initiate the operation of the inventive method. Data in the "elapsed time" data field 220 indicates how long the stylus 146 has been held in one of the proximity zones 230, 232, and will reset each time the stylus 146 is moved out of the proximity zones 230, 232.

In practice, the proximity zones 230 and 232 might not be as wide as illustrated in the example of FIG. 5. However, the proximity zones 230 and 232 are made sufficiently wide in this example such that they can be seen in the view of FIG. 5. It should be noted that, in any case, the proximity zones 230 and 232 are quite narrow, such that most of the remainder of the active area 12 is available to be mapped to the displays (122 and 124 or the like). An example of a mapped display area 238 according to the present invention is outlined in FIG. 5. Optionally, the mapped display area 238 can utilize the entire active area 12, by overlapping proximity zones 230 and 232 with mapped display area 238.

It should be noted that, even where the data in the "monitor ID" data field 210, the "monitor on left" data field 212, the "monitor on right" data field 214, the "preset time" data field 218 and the "proximity width" data field 222 are fixed during the preliminary method 200 discussed above, data in the "active" data field 216, and the "elapsed time" data field 220 will be continually or repeatedly updated during the operation of the inventive method. One skilled in the art will recognize that there are several ways in the art to reduce unnecessary rewriting of files during the operation of the invention. One way would be to link the data fields which need to be updated during the operation of the invention to the sources of such data in the working memory 114. Another way would be to separate the data fields that are being continually updated such that only those fields would need to be rewritten. Neither of these techniques is necessary to the practice of the invention. Rather, it is noted that a programmer would probably want to employ such a technique to make the operation of the invention more efficient.

It should also be noted that there are many obvious modifications which might be made to the arrangement of data described herein and shown in the view of FIG. 7. For example, each of the columns 217a, 217b, 217c could be stored as a separate file, with the rows 210 through 222 being data fields within such files. Where a capacity for multidimensional files is provided, the rows 210 through 222 could be configured as fields with the individual data items configured as subfields. In any case, the term "field" is used herein in a general sense to refer to the data portions discussed in relation thereto, whether or not such data is specifically recorded as fields in the working memory 114.

In view of this disclosure, one skilled in the art will readily be able to implement the steps of the preliminary method 200. Indeed, the user interface could be reduced to a single display page, with a plurality of blocks available for the user to "check" the available choices. Another example, would be to present the choices to the user serially. In any case, the preliminary method 200 can be embodied as a stand alone program, as a part of the tablet driver 132 (FIG. 3), as a part of the graphics program 130 (FIG. 3), or the like, according to how it is most economically feasible to market this part of the invention. Finally on this point, it should be noted that some or all of the optional preliminary method 200 can be eliminated at the user level altogether. For example, the data discussed herein as being in the "preset time" data field 218, and the "proximity width" data field 220 could be encoded in the program in which the invention is embodied. In such case, these parameters would be fixed and the user would be offered no choices. Indeed, even the quantity of displays and even their relative relationship could be fixed in a program, in which the user would be given no choices regarding those parameters, either.

FIG. 8 is a flow diagram summarizing an example of an automatic pointing device mapping method 400. According to the automatic pointing device mapping method 400, in a "monitor position" operation 402, the position of the stylus 146 over the active area 12 of the graphics tablet 10 is generally continuously monitored. This operation is known in the prior art, since the position of the stylus is monitored to accomplish the purposes of the graphics program 130 (FIG. 3). Generally, the tablet driver 132 (FIG. 3) will record the position of the stylus 146 as indicated by the stylus position data block 150 of FIG. 3. Therefore, the "monitor position" operation 402 will generally consist merely of reading the data in the stylus position data block 150 (FIG. 3). In an "in zone" decision operation 404 it is determined whether the stylus 146 is positioned in either of the proximity zones 230, 232, as defined by the data of the "proximity width" data field 222 (FIG. 9). If the stylus 146 is not positioned over either of the proximity zones 230, 232, the automatic pointing device mapping method 400 returns to monitoring the position of the stylus in the "monitor position" operation 402. If it is determined that stylus 146 is positioned over one of the proximity zones 230, 232, then in a "corresponding monitor" decision operation 406 it is determined if there is a display 122, 124 (FIG. 4) corresponding to the proximity zone 230 or 232 over which stylus 146 is positioned. In other words, is there a display adjacent the active display 408 on the side of the indicated proximity zone 230 or 232? Which of the displays 122, 124 is the active display 408 is determined by reference to the "active" data field 216 of the operational data block 152 (FIGS. 1 and 7). Whether there is a display 122, 124 corresponding to the selected one of either the left proximity zone 230 or the right proximity zone 232 is determined by reference to the "monitor on left" data field 212 or the "monitor on right" data field" 214, respectively. For example, referring to the example of FIG. 7, monitor 2 is the active display, and if the left proximity zone 230 (FIG. 5) is selected, then there is a corresponding monitor, since the "1" in the "monitor on left" data field 212 under the second data column 217b indicates that there is a monitor on the left of monitor number 2.

If it is determined in the "corresponding monitor" decision operation 406 that there is no display available corresponding to the proximity zone 230, 232 over which the stylus 146 is positioned, the method continues to monitor the position of the stylus 146 in the "monitor position" operation 402. If it is determined in the "corresponding monitor" decision operation 406 that there is a display available corresponding to the proximity zone 230, 232 over which the stylus 146 is positioned, then the automatic pointing device mapping method 400 continues to a "monitor time" operation 410. In the "monitor time" operation 410 the amount of time which the stylus 146 remains in the same proximity zone 230, 232 is monitored. One skilled in the art will be readily able to accomplish this operation. The exact manner to best accomplish it will depend upon the resources available in the particular computer system, operating system, and the like. A typical method will be to start a timer when it is first detected that the stylus 146 is in the proximity zone 230, 232, and stop and reset the timer either upon the stylus 146 leaving the proximity zone or else when the amount of time recorded as data in the preset time row 218 (FIG. 7) is reached. However, one skilled in the art will know how the particular system he or she is using best accomplishes such a task.

In a "time in zone" decision operation 412, when the time recorded as data in the "elapsed time" data field is reached, and if the stylus 146 is still in the proximity zone 230 or 232 as discussed above, then the mapped display area 238 (FIG. 5) of the graphics tablet 10 is remapped to the display 122 or 124 (FIG. 4) as indicated in a "remap tablet" operation 414. The "remap tablet" operation 414 is essentially the same operations performed in the prior art when the user took the action necessary to select the other display 122 or 124, except that this action is triggered, according to the present invention, automatically by the method described, rather than requiring a distinct separate action by the user. Remapping the graphics tablet 10 will entail switching which of the displays 122 or 124 is being controlled from the graphics tablet 10, and also adjusting the size and shape of the mapped display area, if the latter is necessary to conform to the shape of the newly selected display 122 or 124 and the requirements of the program (such as the graphics program 130) being used.

FIG. 9 is a flow diagram summarizing another example of an automatic pointing device mapping method 420. The example of FIG. 9 differs from that of FIG. 8 in that the "monitor time" operation 410 and the "time in zone" decision operation 412 are omitted. Therefore the example of FIG. 9 illustrates the fact that the "timing" aspect of the method previously described is optional. That is, this embodiment of the inventive method causes the graphics tablet 10 to remap as soon as it is discovered that the stylus 146 has entered either of the proximity zones 230 or 232, provided that there is an available monitor in that chosen direction.

Unless specifically stated, the order of the steps of various methods described is not a necessary aspect of the invention. Indeed, one skilled in the art will recognize that certain of the steps could readily be interposed without affecting the operation of the invention.

Although the invention has been described herein in relation to monitoring the position of the stylus, it should be noted that a cursor 422 (FIG. 4) on the active display 408 will move in response to the position and/or movement of the pointing device (the stylus 146) in the example discussed above. Therefore, the invention could be described and implemented in terms of the position of the cursor 422, rather than the position of the pointing device. Although the invention has been described herein using the proximity zones 230, 232 on the graphics tablet 10, it should be recognized that there are several obvious alternatives. Just one example of such would take advantage of the fact that the cursor 422 (FIG. 4) on the active display 408 is moved by the pointing device (as represented by the graphics tablet 10 in the example above). One skilled in the art could readily modify the invention from that of the specific examples given such that the pointing device would be remapped to one of the displays 122 or 124 when, for example, the cursor 422 is caused to abut an edge 424 of the display 122 or 124 for a specified amount of time. Also, although the invention has been described herein in terms of remapping the graphics tablet 10, which is an example of an APD, it should be noted that the invention could readily be adapted for use with essentially any type of pointing device by monitoring the position of the cursor 422 as described above.

It should also be noted that other input from a pointing device can be used to trigger the automatic remapping of the pointing device to another display. For example, input from a pointing device indicating the selection of a directional arrow presented to the user on the active display could be used to trigger the remapping process. As yet another example, separate keys, buttons, or the like (corresponding to adjacent monitors if present) can be provided on the input device.

Figure 10:
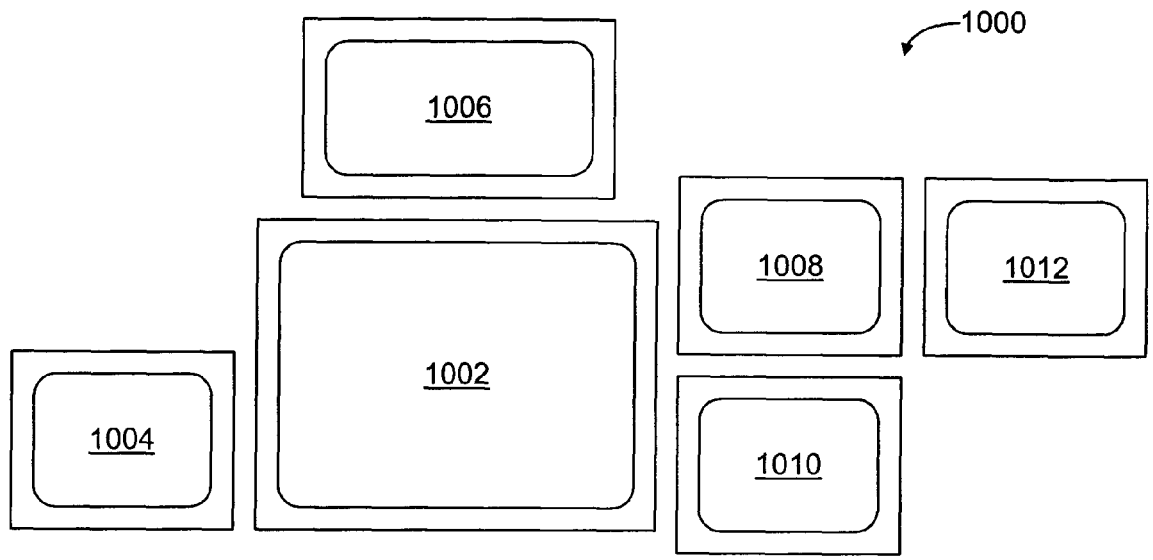
FIG. 10 is a block diagram of a more complex monitor array.

FIG. 10 is a block diagram of a more complex array 1000 of monitors 1002, 1004, 1006, 1008, 1010, and 1012, wherein the present invention can also be employed. As indicated above, the data structure shown in FIG. 7 is rather simplistic, and is shown to illustrate aspects of the present invention in a clear and uncomplicated manner. However, the particular data structure shown in FIG. 7 might be impractical for more complicated monitor arrays such as array 1000. For example, simple boolean operators (indicating whether there is a monitor to the left or right) might suffice to provide the relative positions of three monitors lined up in a row, but are insufficient to provide the positional relationships between the monitors of array 1000. In particular, note that monitor 1006 is positioned above monitor 1002. Note also that monitors 1008 and 1010 are both to the right of monitor 1002. Thus, simple left and right relationships are insufficient to uniquely identify a particular one the monitors to which a pointing device is to be remapped.

Figure 11:
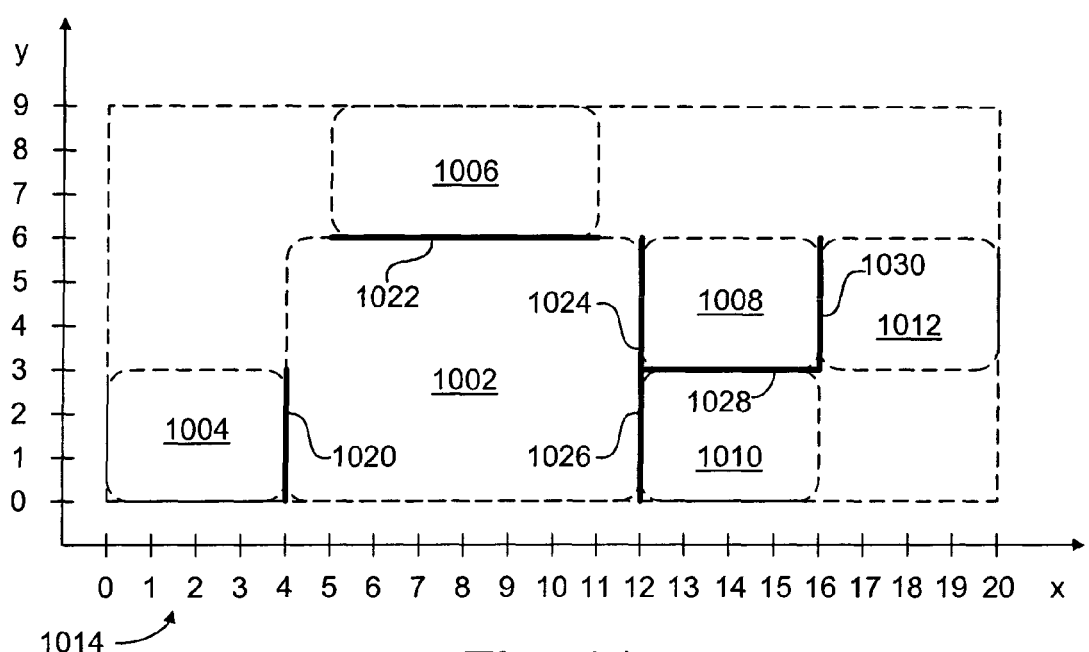
FIG. 11 shows the viewing areas of the monitors of FIG. 10 arranged in a Cartesian coordinate system.

FIG. 11 shows the active display areas of monitors 1002, 1004, 1006, 1008, 1010, and 1012 arranged in an x-y Cartesian coordinate system. Arranging representations of the monitor's display areas in an absolute coordinate system, such that their respective perimeters overlap at positions indicative of the monitor's real physical size and positional relationships, provides an effective way to manage monitor-to-monitor transition in even the most complex monitor arrays. For example, the overlapping perimeters of the display areas of monitors 1002 and 1004 along line 1020 indicate that monitor 1004 is located to the left of monitor 1002, and that monitor 1004 is only half as tall as monitor 1002. Similarly, the perimeter intersection between monitor 1002 and monitor 1006, along line 1022, indicates that monitor 1006 is centered above and slightly narrower than monitor 1002. Intersection line 1024 indicates that monitor 1008 is positioned to the right of the top half of monitor 1002, and intersection line 1026 indicates that monitor 1010 is positioned to the right of the bottom half of monitor 1002. Finally, intersection line 1030 indicates that monitor 1012 is positioned to the right of monitor 1008.

FIG. 12 shows an example data structure 1200 that makes the monitor size and position information contained in FIG. 11 available for use in the automatic remapping operations described herein. Each record of data structure 1204 includes a "monitor ID" field 1202 and "perimeter coordinates" field 1204. The monitor ID field contains data that uniquely identifies each monitor in array 1000. The perimeter coordinates field contains data indicative of the position of the associated monitor, which in this example is the coordinates of the monitors display area perimeter in coordinate system 1014 of FIG. 11. Thus, when it is determined that stylus 146 is in a proximity zone (e.g., in operation 404 of FIG. 9), then it can be determined if there is a corresponding monitor (e.g., operation 406 of FIG. 9) by searching the records to determine if the perimeter coordinates of any other monitor match the perimeter coordinates of the active monitor nearest the current location of stylus 146. If so, tablet 10 is remapped to the monitor associated with the matching coordinates.

FIG. 13 shows another example data structure 1300 suitable for use with the present invention. Each record in data structure 1300 includes a boundary ID field 1302, a boundary location field 1304, a (−) monitor ID field 1306, and a (+) monitor ID field 1308. Boundary ID field 1302 contains data that uniquely identifies a particular overlap of the display areas shown in FIG. 11. In this example, the boundary ID data corresponds to the indices of intersection lines 1020, 1022, 1024, 1026, 1028, and 1030 shown in FIG. 11, to clearly show the relationship of the data to FIG. 11.

Boundary location field 1304 contains data indicative of the location of boundaries between adjacent monitors. In this example, this data includes the coordinates of intersection lines 1020, 1022, 1024, 1026, 1028, and 1030. Note that the location of each intersection line uniquely identifies each intersection line. Thus, the data in boundary ID filed 1302 is somewhat redundant. However, as indicated above, the boundary ID data is helpful to provide an easy reference to the diagram of FIG. 11.

(−) monitor ID field 1306 contains data that uniquely identifies the particular monitor that is positioned on a first side (e.g., to the left or below) of the boundary location. (+) boundary ID field contains data that uniquely identifies the particular monitor that is positioned on a second side (e.g., to the right or above) of the boundary location. Thus, when it is determined that stylus 146 is in a proximity zone (e.g., in operation 404 of FIG. 9), then it can be determined if there is a corresponding monitor (e.g., operation 406 of FIG. 9) by searching the records to determine if the current location of stylus 146 is at or near a boundary location. If so, the active monitor should match the data in either (−) monitor ID field 1306 or (+) monitor ID field 1308 of the record associated with the boundary location, and tablet 10 can be automatically remapped to the monitor identified by the other (the one that didn't match) one of (−) monitor ID field 1306 or (+) monitor ID field 1308 of the record.

The detailed description of particular embodiments of the invention is now complete. All of the above are only some of the examples of available embodiments of the present invention. Those skilled in the art will readily observe that numerous other modifications and alterations may be made. Many of the described features may be substituted, altered or omitted without departing from the spirit and scope of the invention. For example, alternate data structures may be substituted for the example data structures shown. As another example, different quantities of the displays 122 and 124 could be used. As briefly discussed herein, it is conceivable that three, or even more, displays might be used in some applications. Similarly, the arrangement of the displays 122 and 124 might differ from the examples given. For example it is possible that a user might wish to place one display above another. In such an instance, proximity zones (not shown) could be placed along the upper and lower edges of the active area 12 on the graphics tablet 10. Still another variation of the invention would be to monitor whether or not the stylus 146 "disappears" across on edge of the active area 12. For example, if the stylus 146 were monitored moving toward an edge, then up to the edge, and then immediately thereafter no trace of the stylus upon the active area 12 were detected, it could be assumed that the stylus 146 had been moved across the edge of the active area 12, and a corresponding remapping of the graphics tablet 10 could be initiated. Another obvious variation of the invention would be to employ "virtual" displays. That is, where an additional physical display device is not available or wanted, an existing display device could be switched between alternative displays using the automated method described herein. These and other deviations from the particular embodiments shown will be apparent to those skilled in the art, particularly in view of the foregoing disclosure. Therefore, one skilled in the art could readily create variations of the invention to adapt it according to the needs or convenience of a particular application. Accordingly, this disclosure is not intended as limiting and the appended claims are to be interpreted as encompassing the entire scope of the invention.

I claim:

1. An input device control method for mapping an absolute input device to a plurality of displays, comprising:

mapping the absolute input device to a first one of the displays;

detecting a position indicated by the absolute input device;

determining if the position indicated by the absolute input device is a position that corresponds to another one of the displays; and remapping the absolute input device to the other one of the displays.

2. The method of claim 1, wherein the position corresponding to the other display is near an edge.

3. The method of claim 2, wherein the edge is an edge of a graphics tablet.

4. The method of claim 2, wherein the edge is an edge of an active display.

5. The method of claim 1, wherein the absolute input device is an absolute pointing device.

6. The method of claim 1, wherein the absolute input device includes a graphics tablet.

7. The method of claim 1, wherein the absolute input device includes a stylus.

8. The method of claim 1, wherein remapping the absolute input device includes changing which of the plurality of displays is controlled by the absolute input device.

9. The method of claim 1, and further including a preliminary step of defining the width of a proximity zone near an edge to establish the position corresponding to the other monitor.

10. The method of claim 1, and further including a preliminary step of identifying and storing the relative positions each of the plurality of displays.

11. The method of claim 1, and further including:
a preliminary step of recording the existence or nonexistence of a display on the left of each of the plurality of displays; and
a preliminary step of recording the existence or nonexistence of a display on the right of each of the plurality of displays.

12. The method of claim 1, and further including determining how long the absolute input device has indicated the position corresponding to the other one of the displays.

13. The method of claim 1, and further including:
a preliminary step of setting an elapsed time which the absolute input device must remain indicating a position near an edge before the absolute input device is remapped.

14. The method of claim 1, wherein the step of determining if the position indicated by the absolute input device is a position that corresponds to another one of the displays includes:
determining which of the plurality of displays is inactive display;
determining whether the absolute input device is indicating a position near a specific edge; and
determining if there is a display in a direction indicated by the specific edge.

15. The method of claim 1, wherein:
the position indicated by the absolute input device is a left edge.

16. An electronically readable storage medium having code embodied therein for causing an electronic device to perform: the method of claim 1.

17. An electronically readable storage medium having code embodied therein for causing an electronic device to perform the method of claim 2.

18. An electronically readable storage medium having code embodied therein for causing an electronic device to perform the method of claim 3.

19. An electronically readable storage medium having code embodied therein for causing an electronic device to perform the method of claim 4.

20. An electronically readable storage medium having code embodied therein for causing an electronic device to perform the method of claim 5.

21. An electronically readable storage medium having code embodied therein for causing an electronic device to perform the method of claim 6.

22. An electronically readable storage medium having code embodied therein for causing an electronic device to perform the method of claim 7.

23. An electronically readable storage medium having code embodied therein for causing an electronic device to perform the method of claim 8.

24. An electronically readable storage medium having code embodied therein for causing an electronic device to perform the method of claim 9.

25. An electronically readable storage medium having code embodied therein for causing an electronic device to perform the method of claim 10.

26. An electronically readable storage medium having code embodied therein for causing an electronic device to perform the method of claim 11.

27. An electronically readable storage medium having code embodied therein for causing an electronic device to perform the method of claim 12.

28. An electronically readable storage medium having code embodied therein for causing an electronic device to perform the method of claim 13.

29. An electronically readable storage medium having code embodied therein for causing an electronic device to perform the method of claim 14.

30. An electronically readable storage medium having code embodied therein for causing an electronic device to perform the method of claim 15.

31. A computer-readable medium having stored thereon a data structure comprising:
a position field containing data representing a position for triggering a process for remapping an absolute input device to another display; and
a position field containing data representing the position of the absolute input device; and wherein
the position field contains data representing the width of an area near an edge.

32. The computer-readable medium of claim 31, wherein:
the absolute input device includes a graphics tablet and a stylus; and
the edge is an edge of the graphics tablet.

33. The computer-readable medium of claim 31, and further including a preset time field containing data representing an activation time period.

34. The computer-readable medium of claim 31, and further including an elapsed time field containing data representing an elapsed time.

35. The computer-readable medium of claim 34, wherein the elapsed time is a time which the absolute input device has remained in a designated zone.

36. The computer-readable medium of claim 31, and further including an adjacent monitor field containing data representing the presence of a display adjacent an active monitor.

37. A graphics display system comprising:
a plurality of displays;
a pointing device;
a position monitor; and
a remapper responsive to output from said position monitor, and operative to automatically remap the position monitor from one of the displays to another one of the displays.

38. A graphics display system comprising:
a plurality of displays;
an absolute input device;
means for receiving position data via said absolute input devices; and
means for automatically remapping the absolute input device from one of the displays to another one of the displays responsive to said position data.

39. A method for mapping an absolute input device to multiple displays, said method comprising:
mapping the absolute input device to a first display;
receiving position data from a user via said absolute input device; and
automatically remapping the absolute input device to a second display responsive to said position data.

40. The method of claim 39, wherein the step of automatically remapping the absolute input device to the second display includes:
receiving a predefined input via the absolute input device indicative of a user's desire to use the second display; and
remapping the absolute input device to the second display responsive to receipt of the predefined input.

41. A computer-readable medium having stored thereon a data structure comprising:
a first field containing data indicative of a particular display; and
a second field containing data indicative of said particular display's position relative to a second display; and
wherein said data contained in said second field is further indicative of a location for triggering a process for remapping an absolute input device between said second display and said particular display.

42. A computer-readable medium according to claim 41, wherein: said second field contains perimeter coordinates associated with a display area of said particular display.

43. A computer-readable medium according to claim 41, wherein said second field contains data indicative of the position of a boundary between said particular display and said second display.

44. A computer-readable medium according to claim 43, wherein said data structure further comprises a third field containing data indicative of said second display.

* * * * *

UNITED STATES PATENT AND TRADEMARK OFFICE
CERTIFICATE OF CORRECTION

| | | |
|---|---|---|
| PATENT NO. | : 7,757,186 B2 | Page 1 of 1 |
| APPLICATION NO. | : 10/614606 | |
| DATED | : July 13, 2010 | |
| INVENTOR(S) | : Richard W. Fabrick, II | |

It is certified that error appears in the above-identified patent and that said Letters Patent is hereby corrected as shown below:

In column 6, line 31, delete "10a" and insert -- 110a --, therefor.

In column 13, line 58, in Claim 16, delete "perform:" and insert -- perform --, therefor.

In column 13, line 65, in Claim 19, delete "having," and insert -- having --, therefor.

In column 15, line 5, in Claim 38, delete "devices;" and insert -- device; --, therefor.

Signed and Sealed this
Eighth Day of November, 2011

David J. Kappos
*Director of the United States Patent and Trademark Office*